(12) United States Patent
Ning et al.

(10) Patent No.: US 12,475,307 B2
(45) Date of Patent: Nov. 18, 2025

(54) METHOD AND APPARATUS FOR TABULAR DATA PROCESSING, TERMINAL, AND STORAGE MEDIUM

(71) Applicant: Beijing Zitiao Network Technology Co., Ltd., Beijing (CN)

(72) Inventors: Liaoyuan Ning, Beijing (CN); Xinru Zhang, Beijing (CN); Cong Wang, Beijing (CN); Guangyu Zhang, Beijing (CN); Wenbin Zhang, Beijing (CN); Liang Yan, Beijing (CN); Jinyuan Bian, Beijing (CN); Shi Qiu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/523,862

(22) Filed: Nov. 29, 2023

(65) Prior Publication Data
US 2024/0104298 A1 Mar. 28, 2024

Related U.S. Application Data

(63) Continuation of application No. PCT/CN2022/107357, filed on Jul. 22, 2022.

(30) Foreign Application Priority Data

Jul. 23, 2021 (CN) .......................... 202110839653.9

(51) Int. Cl.
*G06F 40/18* (2020.01)
*G06F 3/0482* (2013.01)
(Continued)

(52) U.S. Cl.
CPC .......... *G06F 40/18* (2020.01); *G06F 3/04842* (2013.01); *G06F 16/9032* (2019.01); *G06F 40/174* (2020.01)

(58) Field of Classification Search
None
See application file for complete search history.

(56) References Cited

U.S. PATENT DOCUMENTS

| | | | | |
|---|---|---|---|---|
| 2009/0106640 | A1* | 4/2009 | Handy | G06Q 10/00 715/212 |
| 2009/0313537 | A1* | 12/2009 | Fu | G06F 16/00 715/201 |

(Continued)

FOREIGN PATENT DOCUMENTS

| | | |
|---|---|---|
| CN | 1696937 A | 11/2005 |
| CN | 108197091 A | 6/2018 |

(Continued)

OTHER PUBLICATIONS

International Search Report and Written Opinion for International Application No. PCT/CN2022/107357, mailed Sep. 28, 2022, 12 Pages.

(Continued)

*Primary Examiner* — Mustafa A Amin

(57) ABSTRACT

The disclosure provides a method and an apparatus for tabular data processing, a terminal, and a storage medium. The method for tabular data processing includes: in response to a triggering operation of a specific control associated with a specified table, presenting a field filtering interface; wherein each candidate field name in the field filtering interface is a predetermined field name that exists in at least one data system, and each candidate field name in the field filtering interface has an association relationship with a field name corresponding to a filled column in the specified table; in response to a field name selecting operation on the field filtering interface, adding the selected field name into the specified table; and complementing data corresponding to (Continued)

data of a filled column and each field name in the specified table; wherein the complemented data is data from the at least one data system.

18 Claims, 5 Drawing Sheets

(51) Int. Cl.
  *G06F 3/04842* (2022.01)
  *G06F 16/9032* (2019.01)
  *G06F 40/106* (2020.01)
  *G06F 40/174* (2020.01)
  *G06F 40/177* (2020.01)

(56) References Cited

U.S. PATENT DOCUMENTS

| | | | | |
|---|---|---|---|---|
| 2011/0087954 | A1* | 4/2011 | Dickerman | G06F 40/18 715/219 |
| 2017/0147643 | A1* | 5/2017 | Zaidi | G06F 16/24544 |
| 2020/0349320 | A1* | 11/2020 | Owens | G06F 16/86 |

FOREIGN PATENT DOCUMENTS

| | | |
|---|---|---|
| CN | 109063178 A | 12/2018 |
| CN | 109815276 A | 5/2019 |
| CN | 111368520 A | 7/2020 |
| CN | 111597238 A | 8/2020 |
| CN | 111708801 A | 9/2020 |
| CN | 111782651 A | 10/2020 |
| CN | 111783410 A | 10/2020 |
| CN | 112000739 A | 11/2020 |
| CN | 112506493 A | 3/2021 |
| CN | 112835886 A | 5/2021 |
| JP | 2013-507689 A | 3/2013 |
| WO | 01/06416 A2 | 1/2001 |

OTHER PUBLICATIONS

Office action received from Japanese patent application No. 2023-573427 mailed on Jul. 30, 2024, 08 pages (4 pages English Translation and 4 pages Original Copy).

Office action received from Chinese patent application No. 202110839653.9 mailed on Jan. 27, 2025, 14 pages (5 pages English Translation and 9 pages Original Copy).

Office action received from Chinese patent application No. 202110839653.9 mailed on Aug. 2, 2025, 15 pages (6 pages English Translation and 9 pages Original Copy).

* cited by examiner

METHOD AND APPARATUS FOR TABULAR DATA PROCESSING, TERMINAL, AND STORAGE MEDIUM

CROSS REFERENCE

This application is a continuation of International Patent Application No. PCT/CN2022/107357, filed on Jul. 22, 2022, which claims the benefit of Chinese Patent Application No. 202110839653.9, filed on Jul. 23, 2021, and entitled "METHOD AND APPARATUS FOR TABULAR DATA PROCESSING, TERMINAL, AND STORAGE MEDIUM", both of which are incorporated herein by reference in their entireties.

FIELD

The present disclosure relates to the field of information technology, and more particularly to method and apparatus, terminal and storage media for tabular data processing.

BACKGROUND

When processing and analyzing some data (such as product data), it is usually necessary to obtain data from different data systems into a table for analysis. Typically, data is downloaded from multiple data systems into multiple CSV/Excel files and manually edited according to main fields of rows (such as product name, product ID, etc.), and multiple pieces of result data are merged; or, in spreadsheet software such as Excel, data is obtained directly from online application programming interfaces (APIs) into tables through "from the web" function.

SUMMARY

To solve the existing problems, the present disclosure provides a method and an apparatus for tabular data processing, a terminal, and a storage medium.

The present disclosure adopts the following technical solutions.

In some embodiments, embodiments of the present disclosure provides a method for tabular data processing, the method for tabular data processing comprising: in response to a triggering operation of a specific control associated with a specified table, presenting a field filtering interface; wherein each candidate field name in the field filtering interface is a predetermined field name that exists in at least one data system, and each candidate field name in the field filtering interface has an association relationship with a field name corresponding to a filled column in the specified table; in response to a field name selecting operation on the field filtering interface, adding the selected field name into the specified table; and complementing data corresponding to data of a filled column and each field name in the specified table; wherein the complemented data is data from the at least one data system.

In some embodiments, another embodiment of the present disclosure provides an apparatus for tabular data processing, the apparatus for tabular data processing comprising: a field filtering interface presenting module configured to present a field filtering interface in response to a triggering operation of a specific control associated with a specified table, wherein each candidate field name in the field filtering interface is a predetermined field name that exists in at least one data system, and each candidate field name in the field filtering interface has an association relationship with a field name corresponding to a filled column in the specified table; a field name adding module configured to add the selected field name into the specified table in response to a field name selecting operation on the field filtering interface; and a data complementing module configured to complement data corresponding to data of a filled column and each field name in the specified table; wherein the complemented data is data from the at least one data system.

In some embodiments, the present disclosure provides a terminal comprising: at least one memory and at least one processor; wherein the at least one memory is configured to store program code, and the processor is configured to call the program code stored by the memory to execute the method for tabular data processing described above.

In some embodiments, the present disclosure provides a storage medium for storing program code for performing the method for tabular data processing described above.

By adding the selected field name into the specified table in response to a field name selecting operation on the field filtering interface and complementing the data corresponding to the filled column and each field name in the specified table, embodiments of the present disclosure can achieve directly complementing the information to the specified table in a browser or client, reducing a workload of downloading and editing files.

BRIEF DESCRIPTION OF THE DRAWINGS

In conjunction with the accompanying drawings and with reference to the following detailed description, the above and other features, advantages and aspects of various embodiments of the present disclosure will become more apparent. Throughout the drawings, like or similar reference numerals denote like or similar elements. It should be understood that the drawings are illustrative and elements and elements are not necessarily drawn to scale.

DETAILED DESCRIPTION

Figure 1:
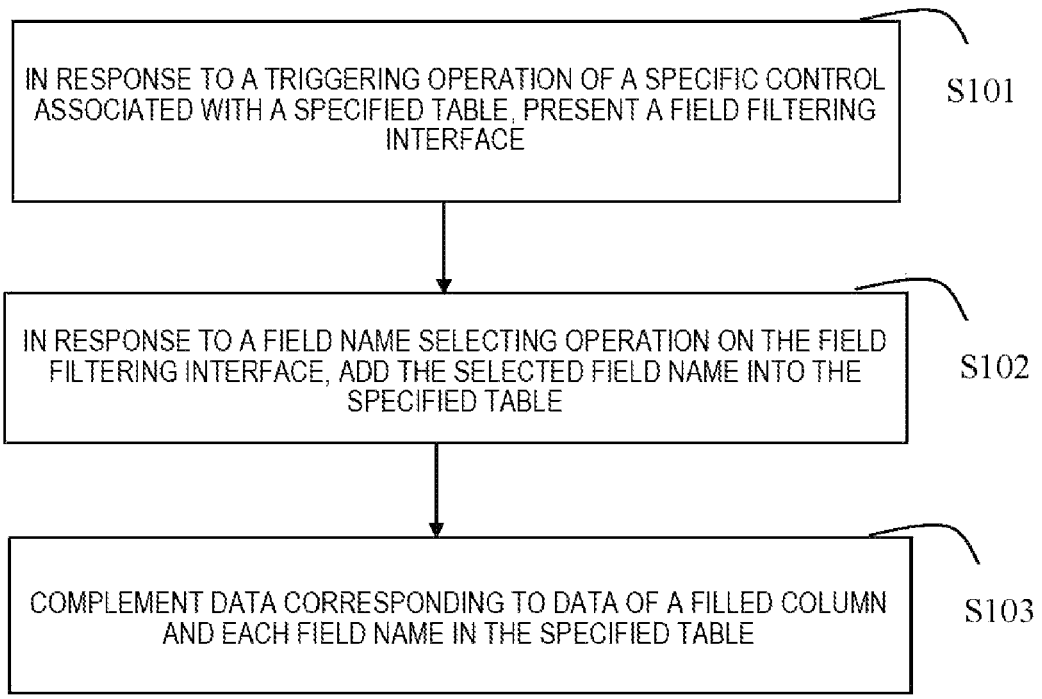
FIG. 1 is a flowchart of a method for tabular data processing of some embodiments of the present disclosure.

Embodiments of the present disclosure will be described hereafter in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

It should be understood that various steps recited in method implementations of the present disclosure can be executed in sequence and/or in parallel. In addition, the method implementations can include additional steps and/or omit the steps shown. The scope of the present disclosure is not limited in this regard.

The term "including" and its variations used herein are open-ended inclusion, i.e. "including but not limited to". The term "based on" means "at least partially based on". The term "an embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in the present disclosure are only used to distinguish different devices, modules, or units, and are not used to limit the order or interdependence of the functions performed by these devices, modules, or units.

It should be noted that the modification of "one" mentioned in the present disclosure is illustrative and not restrictive. Those skilled in the art should understand it as "one or more" unless otherwise specified in the context.

The names of the messages or information exchanged between multiple devices in implementations of the present disclosure are for illustrative purposes only and are not intended to limit the scope of these messages or information.

FIG. 1 provides a flowchart of a method for tabular data processing of embodiments of the present disclosure. The method for tabular data processing of the present disclosure includes a step S101 of, in response to a triggering operation of a specific control associated with a specified table, presenting a field filtering interface.

In some embodiments, the specified table can be an online table or a non-online table which is an offline spreadsheet. In some embodiments, the online table usually refers to a table stored in a server rather than a specific terminal, allowing login at different terminals to view the online table. In some embodiments, each candidate field name in the field filtering interface is a predetermined field name that exists in at least one data system and has an association relationship with the field name corresponding to the filled column in the specified table. In some embodiments, the at least one data system can refer to a server that stores data, a productized data management system, or even a data file such as a spreadsheet that stores data.

In some embodiments, the table usually consists of rows and columns, and a filled column refers to a column that has been pre-filled with corresponding data (such as product names). In some embodiments, each candidate field name in the field filtering interface has an association relationship with the field name corresponding to the filled column in the specified table. For example, if the filled column is a mobile phone product, such as a model of various mobile phones, then the candidate field name in the field filtering interface is a field related to the mobile phone product, such as memory, screen size, screen resolution, and other mobile phone-related parameters. Therefore, in a case that the field name (such as product name, etc.) corresponding to the filled column changes, the candidate field name in the field filtering interface also changes accordingly. For example, when the filled column is a skincare product, each candidate field name in the field filtering interface is a field related to the skincare product, such as shelf life, main ingredients, etc.

Figures 2, 3:
FIG. 2 is a schematic table of some embodiments of the present disclosure.
FIG. 3 is a schematic view of field filtering interface of another embodiment of the present disclosure.

The method of the present disclosure further comprises a step S102 of adding the selected field name into the specified table in response to a field name selecting operation on the field filtering interface. In some embodiments, the field name selecting operation on the field filtering interface may include an input or check operation of the corresponding field name, etc. For example, as shown in FIG. 2, a schematic diagram of a specified table in some embodiments is shown, in which the filled column is the first column, and the field name corresponding to the filled column is a home appliance product model (e.g., product 1, product 2, etc.). In response to the field name selecting operation on the field filtering interface, the selected field name (e.g., manufacturer, power, price, etc.) is added to the specified table.

The method of the present disclosure further comprises a step S103 of complementing the data corresponding to the filled column and each field name in the specified table. In some embodiments, the complemented data is data from at least one data system. As shown in FIG. 2, the data corresponding to the filled column (product 1, product 2, etc.) and each field name (manufacturer, power, price, etc.) is complemented in the specified table.

By presenting a field filtering interface in response to a triggering operation of a specific control associated with a specified table, adding the selected field name into the specified table in response to a field name selecting operation on the field filtering interface, and complementing the data corresponding to the filled column and each field name in the specified table, embodiments of the present disclosure can achieve directly complementing the information to the specified table in a browser or client, reducing a workload of downloading and editing files. The conventional operation is to download the corresponding data from various data systems and then integrate them together. By adopting the method of the present disclosure, data can be automatically obtained from at least one data system through a triggering operation of the specific control, and the obtained data can be complemented to the specified table, significantly reducing a workload of editing and organizing related data.

FIG. 3 shows a schematic diagram of the field filtering interface in some embodiments. As shown in FIG. 3, in some embodiments, the field filtering interface also includes an insertion start column input control. In some embodiments, adding the selected field name into the specified table includes: adding the selected field name into the specified table starting from the inputted insertion start column. For example, if the insertion start column determined on the field filtering interface is column B, the selected field name "manufacturer" is added to column B of the specified table; if the insertion start column determined on the field filtering interface is column H, the selected field name "manufacturer" is added to column H of the specified table. This allows the user to add the corresponding field name to the user-specified column.

As shown in FIG. 3, in some embodiments, the field filtering interface also includes a field search control. In some embodiments, the method for tabular data processing further includes: in response to the information inputted in the field search control, presenting a field name that matches the inputted information, where the presented field name is a field name that exists in at least one data system. For example, some field names may not be displayed in the current field filtering interface, and can be searched and presented through the search control at this time. For example, when entering "magnitude" in the field search control, the field name "size" matching the inputted information "magnitude" is presented, and the field name "size" is a field name that exists in at least one data system. By setting the field search control on the field filtering interface, the user can more conveniently find and select the corresponding field name.

In some embodiments, the method for tabular data processing further includes: updating data in the specified table in response to an operation requesting to update data, and displaying the changed data differentially. In some embodiments, it is sometimes necessary to update the data information in the specified table because the data information in the data system may have updating over time. In this way, the above steps of complementing the data can be repeated, and the previous data can be overwritten by the updated data to achieve the effect of data updating. In this way, the data updating of the specified table in the present disclosure can be carried out on the basis of a previous version, which is very convenient for data updating. In some embodiments, when the updated data is different from the previous data, the corresponding cells or updated data can be displayed differentially (for example, marked). That is, when the updated data is different from the previous version of the data, the data of the corresponding cells has changed. By displaying the cells or updated data differentially, users can know which data has changed, which is convenient for users to process the data. In some embodiments, the differential display or marking may include changing the color of the font and/or highlighting the background mark. In the existing method for tabular data updating, it is usually necessary to re-download from the data system and then re-integrate the data. By adopting the method of the present disclosure, the data updating can be performed on the basis of the previous version, and the changed data can be displayed differentially, greatly facilitating data processing of the users.

In some embodiments, the specific control is a plugin of the browser, and the method for tabular data processing is performed by the plugin. In some embodiments, the specified table (such as online tables) can be displayed in real time in the browser, and the method for tabular data processing can be realized by the plugin of the browser, which greatly facilitates the data processing of the table and improves the efficiency of the data processing of the table.

In some embodiments, before the step of presenting the field filtering interface, the method for tabular data processing further includes: obtaining the field name corresponding to the filled column from the specified table, sending a query request containing the obtained field name to the server. In some embodiments, the field name used in different data systems may be different for the same data information. Before querying the data corresponding to the corresponding field name to each data system, a query request containing the obtained field name can be sent to the server to obtain the specific representation of the corresponding field name in each data system. Then, the field name query request result fed back by the server is received. In some embodiments, the field name query request result is obtained through query by the server based on a pre-stored field name mapping list, which stores a mapping relationship of each field name in at least one system. Through the field name mapping list, it is possible to realize the query of the corresponding field name in multiple different data systems using the same field name corresponding to the filled column obtained from the specified table.

In some embodiments, the filled column of the specified table is a pre-specified column or a first column. Generally, the corresponding information is first filled in the first column, but of course, any column can also be pre-specified as the filled column.

In some embodiments, before complementing the data of the filled column and the data corresponding to each field name in the specified table, the method for tabular data processing further includes: sending a data query request containing the data of the filled column and each field name in the table to the server. For example, if the power of product 1 is to be queried, the data query request containing product 1 and the field name "power" is sent to the server, and the server queries the corresponding data query request result to the corresponding data system. Then, the data query request result fed back by the server is received. In some embodiments, the data query request result is obtained through query by the server based on data of at least one data system. Therefore, by the method of the present disclosure, the corresponding data query request result can be automatically received from the server, and the efficiency of data query can be improved.

In some embodiments, the triggering operation of the specific control associated with the specified table comprises: an operation that triggers a specific control (e.g., plugin) of the browser on an online table page. This usually applies in the case of online tables.

In some embodiments, the triggering operation of the specific control associated with the specified table includes: an operation of inputting an identifier of an offline spreadsheet in the specific control and triggering an operation of the specific control. This situation also applies to conventional tables, such as Excel tables. For example, by installing a corresponding applet or client, the identifier of the offline spreadsheet is inputted in the specific control of the applet or client, such that the spreadsheet as the operation object can be determined, and then subsequent data complementing or updating can be performed by triggering the operation of the specific control.

Figure 4:
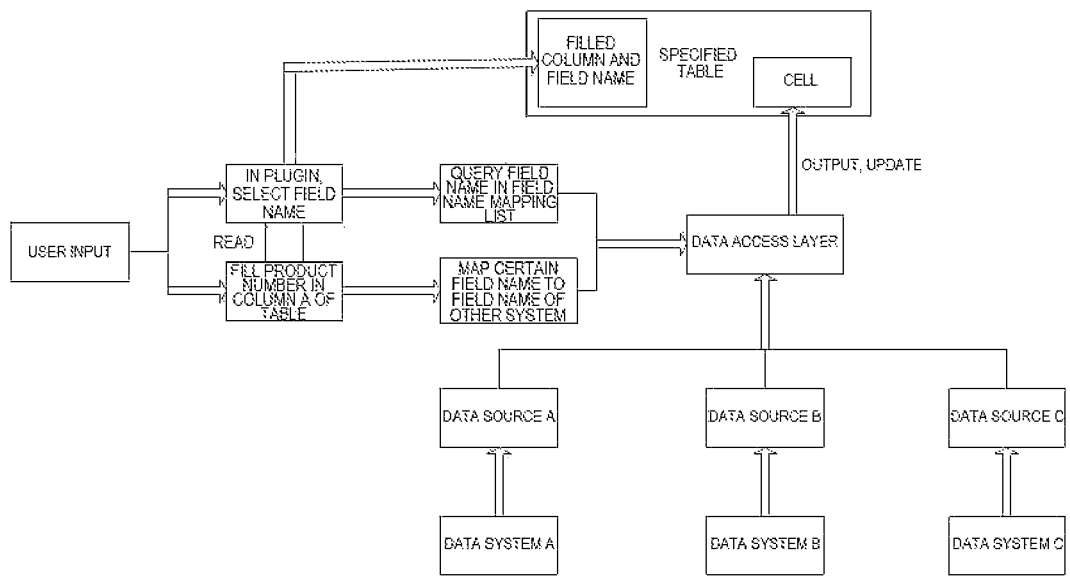
FIG. 4 is a schematic flowchart of a method for tabular data processing of another embodiment of the present disclosure.

The above method for tabular data processing will be described below in conjunction with FIG. 4 to better understand the embodiments of the present disclosure. As shown in FIG. 4, the data (e.g., product number) and field name of the filled column inputted or selected by the user are received, and a data query request is sent to the server. The data query request includes the data of the filled column of the online table and the field name selected by the user. Then, the server obtains the field name existing in the corresponding data system in the field name mapping list based on the field name, and maps the corresponding field name to the field name of the corresponding other system based on the field name mapping list, entering a data access layer. Data information (e.g., data source A, data source B, and data source C) obtained from various data systems (e.g., system A, system B, and system C) is returned to the data access layer. Then the corresponding data information outputted by the server is received, and the corresponding data information is complemented into a cell corresponding to the data of the filled column of the specified table and each field name.

Figure 5:
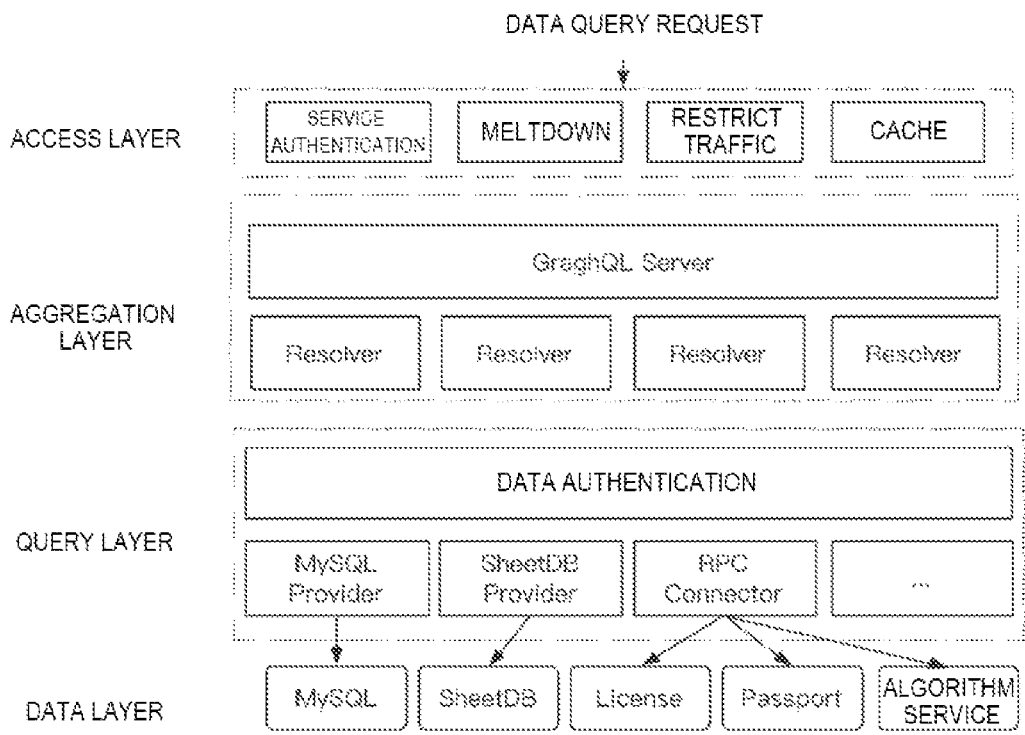
FIG. 5 is a schematic diagram of a logical layer of a server of some embodiments of the present disclosure.
Figure 6:
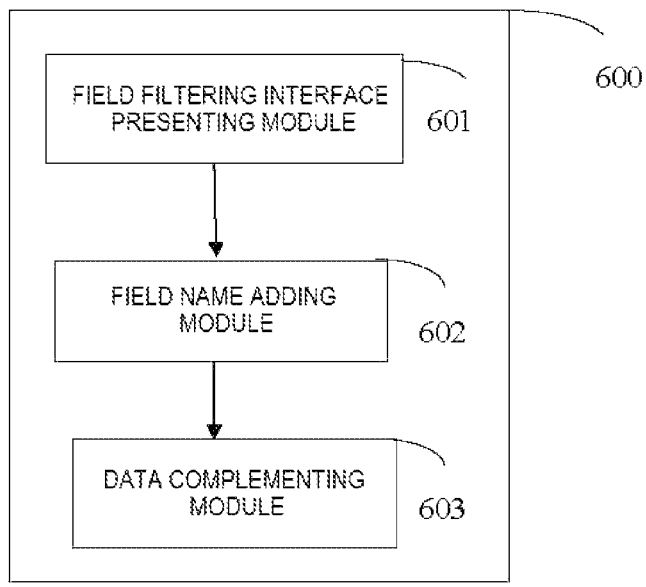
FIG. 6 is partial modules of an apparatus for tabular data processing of some embodiments of the present disclosure.

In some embodiments, in order to clearly illustrate the execution steps of the server in the embodiments of the present disclosure, please refer to FIG. 5, which schematically shows an architecture of the server. In some embodiments, the server includes an access layer, an aggregation layer, a query layer, and a data layer. It receives a data query request sent by the plugin (or client, applet) of the browser in the access layer. After receiving the data query request, it can perform service authentication on the data query request to determine whether there is an authority to obtain data information. It can restrict traffic when a real-time access volume to the server exceeds a first predetermined value, limit a data transmission volume with the aggregation layer, and pause receiving the data query request when the real-time access volume exceeds a second predetermined value. A cache may be provided in the access layer to temporarily store the data query request. The target object associated with the target information transmitted by the access layer and the predetermined information type to be searched are received at the aggregation layer. Then, a unified entity information query language provided based on a GraphQL protocol is used. The aggregation layer has a resolver (Resolver) to resolve an information obtaining request and generate an information query statements for an information source paragraph and a conditional paragraph. The specific generation method is the same as described above. The information query statement is transmitted to the query layer, and the information query statement is resolved at the query layer. Information authentication is performed firstly to determine having an authority to obtain associated information in predetermined other systems. In the case of having this authority, it is connected to other systems through connection ports that can be accessed by other systems (such as information bases) to obtain information associated with target information stored in other systems. Different predetermined systems can use different databases, such as My SQL databases and SheetDB databases. Different databases require using different connectors, so MySQL Provider and SheetDB Provider can be used to connect to the corresponding databases. It can also be connected to other predetermined systems by way of remote login. At this time, a RPC (Remote Procedure Call Protocol) Connector can be used to call an algorithm service through an authorization file License and a password Passport to obtain the associated information. In some embodiments, after obtaining the information associated with the target information from other systems, the server sends it to a first plugin of the browser for aggregation display on the browser. In some embodiments, the server sends the information associated with the target information obtained from other systems to the first plugin of the browser of the terminal, so that the first plugin aggregates the obtained associated information for user viewing.

The embodiments of the present disclosure also provide an apparatus 600 for tabular data processing comprising a field filtering interface presenting module 601, a field name adding module 602, and a data complementing module 603. In some embodiments, the field filtering interface presenting module 601 is configured to present a field filtering interface in response to a triggering operation of a specific control associated with a specified table, wherein each candidate field name in the field filtering interface is a predetermined field name that exists in at least one data system, and has an association relationship with a field name corresponding to a filled column in the specified table. In some embodiments, the field name adding module 602 is configured to add the selected field name into the specified table in response to a field name selecting operation on the field filtering interface. In some embodiments, the data complementing module 603 is configured to complement data corresponding to data of a filled column and each field name in the specified table; wherein the complemented data is data from the at least one data system.

It should be understood that the contents of the method for tabular data processing described herein also applies to the apparatus 600 for tabular data processing, for simplicity, not described in detail herein.

In some embodiments, the field filtering interface further comprises an insertion start column input control; the adding the selected field name into the specified table comprises: adding the selected field name into the specified table starting from the inputted insertion start column. In some embodiments, the field filtering interface further comprises a field search control; the field filtering interface presenting module is further configured to, in response to information inputted in the field search control, presenting a field name matching with the inputted information, wherein the presented field name is a field name existing in the at least one data system. In some embodiments, the apparatus for tabular data processing further includes: a data updating module configured to, in response to an operation requesting to update data, update data in the specified table, and display the changed data differentially. In some embodiments, the specific control is a plugin of a browser and the method for tabular data processing is performed by the plugin. In some embodiments, the apparatus for tabular data processing further includes: a query request sending module configured to, before the step of presenting the field filtering interface, obtain the field name corresponding to the filled column from the specified table, send a query request containing the obtained field name to a server; a request result receiving module configured to receive a field name query request result fed back by the server; wherein the field name query request result is obtained through query by the server according to a pre-stored field name mapping list, the field name mapping list stores a mapping relationship of each field name in the at least one system. In some embodiments, the filled column of the specified table is a pre-specified column or a first column. In some embodiments, the query request sending module is further configured to, before complementing data corresponding to data of a filled column and each field name in the specified table, send a data query request containing the data of the filled column and each field name in the table to a server. The request result receiving module is further configured to receive a data query request result fed back by the sever; wherein the data query request result is obtained through query by the server based on the data of the at least one data system. In some embodiments, the triggering operation on the specific control associated with the specified table includes: an operation of triggering a specific control of a browser on an online table page; or an operation of inputting an identifier of an offline spreadsheet in the specific control and triggering the specific control.

The method for tabular data processing of the present disclosure can automatically query corresponding data information from multiple different data systems based on the data of the filled column and the field name, and then output it to corresponding cells of corresponding clients, achieving intelligent organizing of data information in the specified table. Compared with the usual organizing after downloading data separately from each system, it greatly saves the workload of data organizing In addition, because the field name mapping list is stored in the server, and the field name mapping list includes the mapping relationship of field names between different data systems, it can query the field name in other data systems by using the field name in one data system through the mapping relationship of the field names between different data systems, and the data information corresponding to the field name can be obtained.

Further, the present disclosure also provides a terminal comprising: at least one memory and at least one processor; wherein the at least one memory is configured to store program code, and the processor is configured to call the program code stored by the memory to execute the method for tabular data processing described above.

Further, the present disclosure also provides a computer storage medium, the computer storage medium stores program code for performing the method for tabular data processing described above.

Above, the method and apparatus for tabular data processing of the present disclosure are explained based on embodiments and application examples. In addition, the present disclosure also provides a terminal and a storage medium. The terminal and the storage medium will be explained hereafter.

Figure 7:
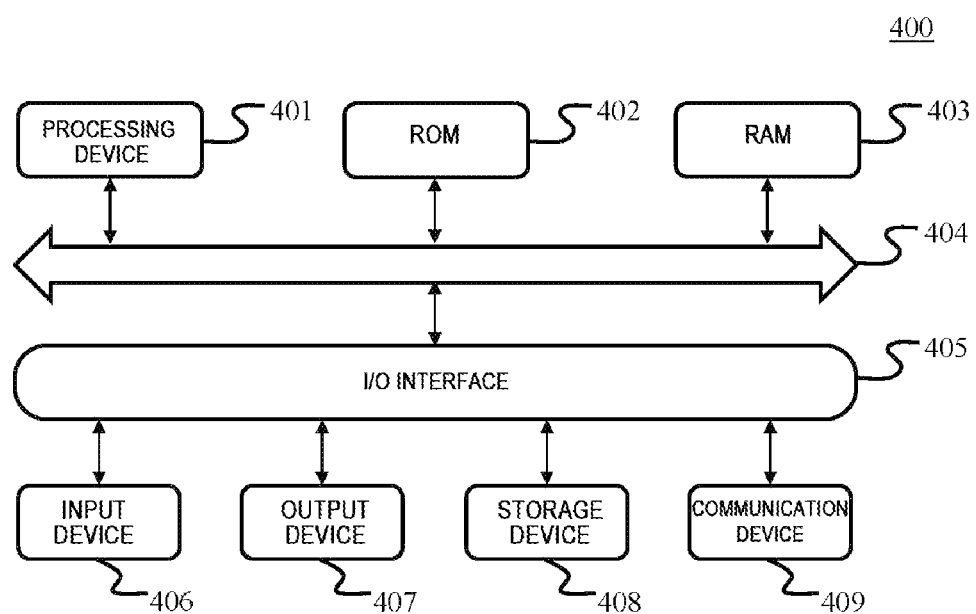
FIG. 7 is a schematic structural view of an electronic device of an embodiment of the present disclosure.

Referring to FIG. 7 in the following, which illustrates a schematic structural diagram suitable for implementing the electronic device 400 (for example a terminal device or a server) in the embodiments of the present disclosure. The terminal device in the embodiments of the present disclosure may comprise, but does not limit, a mobile terminal, such as, a mobile phone, a notebook computer, a digital broadcasting receiver, a personal digital assistant (PDA), a PAD (tablet), a portable multimedia player (PMP), a vehicle-mounted terminal (e.g., in-vehicle navigation terminal), and a fixed terminal, such as, a digital TV, a desktop computer, and the like. The electronic device illustrated in FIG. 7 is only an example without any limitations on the functions and scope of use of the embodiments of the present disclosure.

As shown in FIG. 7, the electronic device 400 may comprise a processing device (e.g., a central processor, a graphics processor, etc.) 401, which may perform various appropriate an operation and process according to the program stored in a read-only memory (ROM) 402 or the program loaded from a storage device 408 into a random access memory (RAM) 403. In the RAM 403, various programs and data required for the operation of the electronic device 400 are also stored. The processing device 401, ROM 402, and RAM 403 are connected to each other via a bus 404. An input/output (I/O) interface 405 is also connected to the bus 404.

Generally, the following devices may be connected to the I/O interface 405: an input device 406 including, for example, touch screen, touchpad, keyboard, mouse, camera, microphone, accelerometer, gyroscope, etc.; an output device 407 including, for example, liquid crystal display (LCD), speaker, vibrator, etc.; a storage device 408 including, for example, magnetic tape, hard drive, etc.; and a communication device 409. The communication device 409 may allow the electronic device 400 to communicate wirelessly or wirelessly with other devices to exchange data. Although FIG. 7 illustrates the electronic device 400 with various devices, it should be understood that it is not required to implement or possess all the illustrated devices. More or fewer devices may be optionally implemented or possessed.

Specifically, according to the embodiments of the present disclosure, the processes described above with reference to the flow charts may be implemented as a computer software program. For example, the embodiments of the present disclosure comprise a computer program product, which comprises a computer program carried on a computer-readable medium. The computer program contains program code for executing the method shown in the flow chart. In such an embodiment, the computer program may be downloaded and installed from the network through the communication device 409, or installed from the storage device 408, or installed from the ROM 402. When the computer program is executed by the processing device 401, the above functions defined in the method of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, electrical, magnetic, optical, electromagnetic, infrared, or semiconductor systems, apparatuses or devices, or any combination thereof. More specific examples of computer-readable storage medium may comprise, but are not limited to: electrical connection with one or more wires, portable computer disk, hard drive, random access memory (RAM), read-only memory (ROM), erasable programmable read-only memory (EPROM or flash memory), optical fiber, portable compact disk read-only memory (CD-ROM), optical storage device, magnetic storage device or any suitable combination of the above. In the present disclosure, the computer-readable storage medium may be any tangible medium that contains or stores a program, which may be used by or in combination with an instruction execution system, apparatus, or device. In the present disclosure, the computer-readable signal medium may comprise data signals propagated in baseband or as part of the carrier, which carry computer-readable program code. Such propagated data signals may take a variety of forms, including but not limited to, electromagnetic signals, optical signals, or any suitable combination of the above. The computer-readable signal medium may also be any computer-readable medium other than a computer-readable storage medium, which can transmit, propagate, or transport a program for use by or in combination with an instruction execution system, apparatus, or device. The program code contained on the computer readable medium may be transmitted using any suitable medium, including but not limited to, wire, optical cable, radio frequency (RF), etc., or any suitable combination of the above.

In some implementations, clients and servers may communicate using any currently known or future developed network protocol, such as, HyperText Transfer Protocol (HTTP), and may interconnect with digital data communication (e.g., communication network) in any form or medium. Examples of communication network comprise local area network (LAN), wide area network (WAN), Internet, and end-to-end network (e.g., ad hoc end-to-end network), as well as any currently known or future developed network.

The above-mentioned computer readable medium may be contained in the above-mentioned electronic device; optionally, it may exist separately without being assembled into the electronic device.

The above-mentioned computer readable medium carries one or more programs, the one or more programs, when executed by the electronic device, cause the electronic device to carry the method of the present disclosure described above.

Computer program code for executing the operations of the present disclosure may be written in one or more programming languages or a combination thereof, including object-oriented programming languages, such as, Java, Smalltalk, C++, and conventional procedural programming languages, such as, C or similar programming languages. Program code may be completely executed on the user's computer, partially executed on the user's computer, executed as a standalone software package, partially executed on the user's computer and partially executed on a remote computer, or completely executed on a remote computer or server. In the case involving the remote computer, the remote computer may be connected to the user's computer through any kind of network, including the local area network (LAN) or the wide area network (WAN), or may be connected to an external computer (e.g., using an Internet service provider to connect through the Internet).

The flow chart and block diagram in the accompanying drawings illustrate the architectures, functions, and operations of possible implementations of systems, methods, and computer program products according to various embodiments of the present disclosure. In this regard, each block in the flow chart or block diagram may represent a module, a program segment, or a part of code that contains one or more executable instructions for implementing specified logical functions. It should also be noted that, in some alternative implementations, the functions indicated in the blocks may occur in a different order than that indicated in the accompanying drawings. For example, two blocks shown in succession may actually be executed substantially in parallel, and sometimes they may also be executed in reverse order, which depends on the functions involved. It should also be noted that each of the blocks in the block diagram and/or flow chart, as well as the combination of blocks in the block diagram and/or flow chart, may be implemented with a specialized hardware-based system that performs specified functions or operations, or may be implemented with a combination of specialized hardware and computer instructions.

The units described in the embodiments of the present disclosure may be implemented in software or hardware. In some cases, the units are not limited by the names of the units.

The functions described above herein may be executed, at least in part, by one or more hardware logic components. For example, and without limitation, exemplary types of hardware logic components that may be used comprise: Field Programmable Gate Array (FPGA), Application Specific Integrated Circuit (ASIC), Application Specific Standard Product (ASSP), System On Chip (SOC), Complex Programmable Logic Device (CPLD), and so on.

In the context of the present disclosure, a machine readable medium may be a tangible medium that may contain or store a program for use by or in combination with the instruction execution system, apparatus, or device. The machine readable medium may be a machine readable signal medium or a machine readable storage medium. The machine readable medium may comprise, but are not limited to, electronic, magnetic, optical, electromagnetic, infrared, or semiconductor system, apparatus, or device, or any suitable combination of the above. More specific examples of the machine readable storage medium may comprise electrical connection based on one or more wires, portable computer disk, hard drive, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

According to one or more embodiments of the present disclosure, [Example 1] provides a method for tabular data processing comprising: in response to a triggering operation of a specific control associated with a specified table, presenting a field filtering interface, wherein each candidate field name in the field filtering interface is a predetermined field name that exists in at least one data system, and each candidate field name in the field filtering interface has an association relationship with a field name corresponding to a filled column in the specified table; in response to a field name selecting operation on the field filtering interface, adding the selected field name into the specified table; and complementing data corresponding to data of a filled column and each field name in the specified table; wherein the complemented data is data from the at least one data system.

According to one or more embodiments of the present disclosure, [Example 2] provides the method of Example 1, wherein the field filtering interface further comprises an insertion start column input control; the adding the selected field name into the specified table comprises: adding the selected field name into the specified table starting from the inputted insertion start column.

According to one or more embodiments of the present disclosure, [Example 3] provides the method of Example 1, wherein the field filtering interface further comprises a field search control; the method for tabular data processing further comprises: in response to information inputted in the field search control, presenting a field name matching with the inputted information, wherein the presented field name is a field name existing in the at least one data system.

According to one or more embodiments of the present disclosure, [Example 4] provides a method according to Example 1, wherein the method for tabular data processing further comprises: in response to an operation requesting to update data, updating data in the specified table, and displaying the changed data differentially.

According to one or more embodiments of the present disclosure, [Example 5] provides the method of Example 1, wherein the specific control is a plugin of a browser and the method for tabular data processing is performed by the plugin.

According to one or more embodiments of the present disclosure, [Example 6] provides a method according to Example 5, wherein, before the step of presenting the field filtering interface, the method for tabular data processing further comprises: obtaining the field name corresponding to the filled column from the specified table, sending a query request containing the obtained field name to a server; receiving a field name query request result fed back by the server; wherein the field name query request result is obtained through query by the server according to a pre-stored field name mapping list, the field name mapping list stores a mapping relationship of each field name in the at least one system.

According to one or more embodiments of the present disclosure, [Example 7] provides the method of Example 6, wherein the filled column of the specified table is a pre-specified column or a first column.

According to one or more embodiments of the present disclosure, [Example 8] provides a method according to Example 5, wherein before complementing data corresponding to data of a filled column and each field name in the specified table, the method for tabular data processing further comprises: sending a data query request containing the data of the filled column and each field name in the table to a server; receiving a data query request result fed back by the sever; wherein the data query request result is obtained through query by the server based on the data of the at least one data system.

According to one or more embodiments of the present disclosure, [Example 9] provides a method according to Example 1, wherein the triggering operation on the specific control associated with the specified table comprises: an operation of triggering a specific control of a browser on an online table page; or an operation of inputting an identifier of an offline spreadsheet in the specific control and triggering the specific control.

According to one or more embodiments of the present disclosure, [Example 10] provides an apparatus for tabular data processing comprising: a field filtering interface presenting module configured to present a field filtering interface in response to a triggering operation of a specific control associated with a specified table, wherein each candidate field name in the field filtering interface is a predetermined field name that exists in at least one data system, and each candidate field name in the field filtering interface has an association relationship with a field name corresponding to a filled column in the specified table; a field name adding module configured to add the selected field name into the specified table in response to a field name selecting operation on the field filtering interface; and a data complementing module configured to complement data corresponding to data of a filled column and each field name in the specified table; wherein the complemented data is data from the at least one data system.

According to one or more embodiments of the present disclosure, [Example 11] provides a terminal, comprising: at least one memory and at least one processor; wherein the at least one memory is configured to store program code, and the at least one processor is configured to call the program code stored by the at least one memory to execute the method for tabular data processing of any of the above examples 1 to 9.

According to one or more embodiments of the present disclosure, [Example 12] provides a storage medium for storing program code for performing the method for tabular data processing of any of examples 1 to 9 when executed by a processor.

The above description is only the preferred embodiment of the present disclosure and an explanation of the technical principles used. Those skilled in the art should understand that the scope of the disclosure involved in the present disclosure is not limited to the specific combination of the above technical features, but should also cover other technical solutions formed by any combination of the above technical features or their equivalent features without departing from the above disclosure concept. For example, the technical solution formed by replacing the above features with (but not limited to) technical features with similar functions in the present disclosure.

In addition, although the operations are depicted in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable subcombination.

While the subject matter has been described in language specific to structural features and/or methodological logical acts, it should be understood that the subject matter defined in the appended claims is not necessarily limited to the particular features or acts described above. Rather, the particular features and acts described above are merely exemplary forms of implementation of the claims.

We claim:

1. A method for tabular data processing comprising:
in response to a triggering operation of a specific control associated with a specified table, presenting, by an electronic device, a field filtering interface, wherein each candidate field name displayed in the field filtering interface is a predetermined field name that exists in at least one data system, and wherein the field filtering interface further comprises a field search control configured to receive information for finding a field name not displayed in the field filtering interface;
in response to a field name selecting operation for a candidate field name displayed on the field filtering interface, adding, by the electronic device, the selected field name into the specified table;
complementing, by the electronic device, data corresponding to data of a filled column and each field name in the specified table, wherein the complemented data is data from the at least one data system; and
in response to information inputted in the field search control, presenting, by the electronic device, a field name matching with the inputted information on the field filtering interface for selection, wherein the presented field name is a field name existing in the at least one data system.

2. The method of claim 1, wherein the field filtering interface further comprises an insertion start column input control;
the adding the selected field name into the specified table comprises: adding, by the electronic device, the selected field name into the specified table starting from an inputted insertion start column.

3. The method of claim 1, wherein the method for tabular data processing further comprises:
in response to an operation requesting to update data, updating, by the electronic device, data in the specified table, and displaying the changed data differentially.

4. The method of claim 1, wherein the specific control is a plugin of a browser installed on the electronic device and the method for tabular data processing is performed by the plugin.

5. The method of claim 4, wherein, before the step of presenting the field filtering interface, the method for tabular data processing further comprises:
obtaining, by the electronic device, the field name corresponding to the filled column from the specified table, sending, by the electronic device, a query request containing the obtained field name to a server;
receiving, by the electronic device, a field name query request result fed back by the server; wherein the field name query request result is obtained through query by the server according to a pre-stored field name mapping list, the field name mapping list stores a mapping relationship of each field name in the at least one system.

6. The method of claim 5, wherein,
the filled column of the specified table is a pre-specified column or a first column.

7. The method of claim 4, wherein before complementing data corresponding to data of a filled column and each field name in the specified table, the method for tabular data processing further comprises:
sending, by the electronic device, a data query request containing the data of the filled column and each field name in the table to a server;
receiving, by the electronic device, a data query request result fed back by the server;

wherein the data query request result is obtained through query by the server based on the data of the at least one data system.

8. The method of claim 1, wherein the triggering operation on the specific control associated with the specified table comprises:
an operation of triggering a specific control of a browser on an online table page; or
an operation of inputting an identifier of an offline spreadsheet in the specific control and triggering the specific control.

9. An electronic device comprising:
at least one memory and at least one processor;
wherein the at least one memory is configured to store program code, and the at least one processor is configured to call the program code stored by the at least one memory to execute a method for tabular data processing comprising:
in response to a triggering operation of a specific control associated with a specified table, presenting a field filtering interface, wherein each candidate field name displayed in the field filtering interface is a predetermined field name that exists in at least one data system, and wherein the field filtering interface further comprises a field search control configured to receive information for finding a field name not displayed in the field filtering interface;
in response to a field name selecting operation for a candidate field name displayed on the field filtering interface, adding the selected field name into the specified table;
complementing data corresponding to data of a filled column and each field name in the specified table, wherein the complemented data is data from the at least one data system; and
in response to information inputted in the field search control, presenting a field name matching with the inputted information on the field filtering interface for selection, wherein the presented field name is a field name existing in the at least one data system.

10. The electronic device of claim 9, wherein the field filtering interface further comprises an insertion start column input control;
the adding the selected field name into the specified table comprises: adding the selected field name into the specified table starting from an inputted insertion start column.

11. The electronic device of claim 9, wherein the method for tabular data processing further comprises:
in response to an operation requesting to update data, updating data in the specified table, and displaying the changed data differentially.

12. The electronic device of claim 9, wherein the specific control is a plugin of a browser installed on the electronic device and the method for tabular data processing is performed by the plugin.

13. The electronic device of claim 12, wherein, before the step of presenting the field filtering interface, the method for tabular data processing further comprises:
obtaining the field name corresponding to the filled column from the specified table, sending a query request containing the obtained field name to a server;

receiving a field name query request result fed back by the server; wherein the field name query request result is obtained through query by the server according to a pre-stored field name mapping list, the field name mapping list stores a mapping relationship of each field name in the at least one system.

14. The electronic device of claim 13, wherein,
the filled column of the specified table is a pre-specified column or a first column.

15. The electronic device of claim 12, wherein before complementing data corresponding to data of a filled column and each field name in the specified table, the method for tabular data processing further comprises:
sending a data query request containing the data of the filled column and each field name in the table to a server;
receiving a data query request result fed back by the server; wherein the data query request result is obtained through query by the server based on the data of the at least one data system.

16. The electronic device of claim 9, wherein the triggering operation on the specific control associated with the specified table comprises:
an operation of triggering a specific control of a browser on an online table page; or
an operation of inputting an identifier of an offline spreadsheet in the specific control and triggering the specific control.

17. A non-transitory computer readable storage medium for storing program code for performing the method for tabular data processing when executed by a processor of an electronic device, the method comprising:
in response to a triggering operation of a specific control associated with a specified table, presenting, by the electronic device, a field filtering interface, wherein each candidate field name displayed in the field filtering interface is a predetermined field name that exists in at least one data system, and wherein the field filtering interface further comprises a field search control configured to receive information for finding a field name not displayed in the field filtering interface;
in response to a field name selecting operation for a candidate field name displayed on the field filtering interface, adding, by the electronic device, the selected field name into the specified table;
complementing, by the electronic device, data corresponding to data of a filled column and each field name in the specified table, wherein the complemented data is data from the at least one data system; and
in response to information inputted in the field search control, presenting, by the electronic device, a field name matching with the inputted information on the field filtering interface for selection, wherein the presented field name is a field name existing in the at least one data system.

18. The non-transitory computer readable storage medium of claim 17, wherein the field filtering interface further comprises an insertion start column input control;
the adding the selected field name into the specified table comprises: adding, by the electronic device, the selected field name into the specified table starting from an inputted insertion start column.

* * * * *